United States Patent
Zona et al.

(10) Patent No.: US 6,913,721 B2
(45) Date of Patent: Jul. 5, 2005

(54) PROCESS OF MAKING A CHARGING MEMBER

(75) Inventors: Michael F. Zona, Holley, NY (US); John S. Facci, Webster, NY (US); Michael J. Levy, Webster, NY (US); Rachael L. McGrath, Clifton, NY (US)

(73) Assignee: Xerox Corporation, Stamford, CT (US)

( * ) Notice: Subject to any disclaimer, the term of this patent is extended or adjusted under 35 U.S.C. 154(b) by 301 days.

(21) Appl. No.: 10/228,877

(22) Filed: Aug. 27, 2002

(65) Prior Publication Data

US 2004/0041293 A1 Mar. 4, 2004

(51) Int. Cl.$^7$ ................................ B29C 41/22
(52) U.S. Cl. ................. 264/104; 264/162; 264/163; 264/255
(58) Field of Search ................. 264/104, 162, 264/163, 255

(56) References Cited

U.S. PATENT DOCUMENTS 5,194,207 A * 3/1993 Tokuda et al. .......... 264/255 X
5,662,850 A * 9/1997 Konno et al. ............... 264/162

FOREIGN PATENT DOCUMENTS

| JP | 56001967 A | * | 1/1981 | ................. 264/255 |
| JP | 58148743 A | * | 9/1983 | ................. 264/162 |
| JP | 63318582 A | * | 12/1988 | ................. 264/162 |

OTHER PUBLICATIONS

Co–pending U.S. Appl. No. 10/228,878, filed Aug. 27, 2002, entitled "Long Life Charging Apparatus," by Michael F. Zona et al.

* cited by examiner

Primary Examiner—Leo B. Tentoni

(57) ABSTRACT

Apparatus for charging a substrate, including: an elongated charging member having a crowned surface; an elongated pressure member having the pressure member being supported for pressure engagement with the charging member to form a nip therebetween adapted to receive the substrate. There is also disclosed a method for making the apparatus.

10 Claims, 3 Drawing Sheets

PROCESS OF MAKING A CHARGING MEMBER

Reference is made to commonly-assigned U.S. Pat. No. 6,684,043 by Michael Zona et al., the disclosure of which is incorporated herein.

BACKGROUND OF THE INVENTION

The present invention concerns a charging member for charging a material to be charged such as a light sensitive material for use in electrophotography and electrostatic recording processes in image forming apparatus such as electrophotographic copying machines and printers. More specifically, it relates to a charging member to be pressed on the surface of a material to be charged such as a light sensitive material and a dielectric material for uniformly charging the surface of the material to be charged, and a charging device.

In electrophotographic apparatus, uniform charge is applied to the surface of a material to be charged such as a light sensitive material or a dielectric material. A method of conducting the charging function by using corona generation by applying a high voltage to metal wires has been adopted as a charging treatment means. However, the corona charging method involves a drawback that corona-induced products such as ozone and nitrogen oxides (NOx) formed upon charging and denature the surface of the light sensitive material to deteriorate the light sensitive material or cause image blurring, and that the contamination of the wires gives an undesired effect on the image quality, leading to image deletions.

In addition to the non-contact method described above, there is a contact method of conducting charging by bringing a charging member into contact, or near contact, with a material to be charged. The contact, or near contact, type charging method has an advantage that a voltage to be applied to the charging member is generally low and the amount of ozone formed is extremely small. However, it has three major drawbacks. The first is the electrical stability of the selected material set over the life of the said contact-charging device. Depending on the type of conduction method selected, the conduction medium can drift within the material causing the electrical properties of the charging member to change over time, thereby causing non-uniform charging or stressing of the high voltage power supply that applies high voltage to the charging member. The second difficulty is the achievement of uniform charge in the length-wise direction of the charging member. The uniformity of the charge applied by the charging member is largely attributed to the dimensional uniformity of the contact interface between the said charging member and the member to be charged. The last major challenge in contact type charging is to overcome non-uniform charging caused by toner and toner additive contamination that occurs on the surface of the charging member.

SUMMARY OF THE INVENTION

In view of the above, an aspect of the present invention is to prevent deterioration of the charging performance of a charging member caused by contamination of the surface layer of the charging member, to maintain stable and satisfactory uniform charging property, and image quality for a long period of time.

A further aspect of the present invention is to prevent non-uniform charging of the member to be charged by providing a means of maintaining uniform width of the contact interface between the charging member and the member to be charged.

There is provided a method for fabricating a charging member comprising the steps of: providing a conductive core, forming a conductive elastic layer on the surface of the conductive core, and forming a surface layer on the surface of the conductive elastic layer, said forming step includes forming a first conductive elastic layer ; grinding said first conductive elastic layer; and applying a second surface layer on said first conductive elastic layer.

There is also provided a method for fabricating a charging member for use in electrostactic printing comprising the steps of: providing a conductive core, forming a conductive elastic layer on the surface of the conductive core, and forming a surface layer on the surface of the conductive elastic layer, said forming step includes forming a first conductive elastic layer; grinding said first conductive elastic layer; and applying a second surface layer on said first conductive elastic layer.

DESCRIPTION OF PREFERRED EMBODIMENTS

Figure 1:
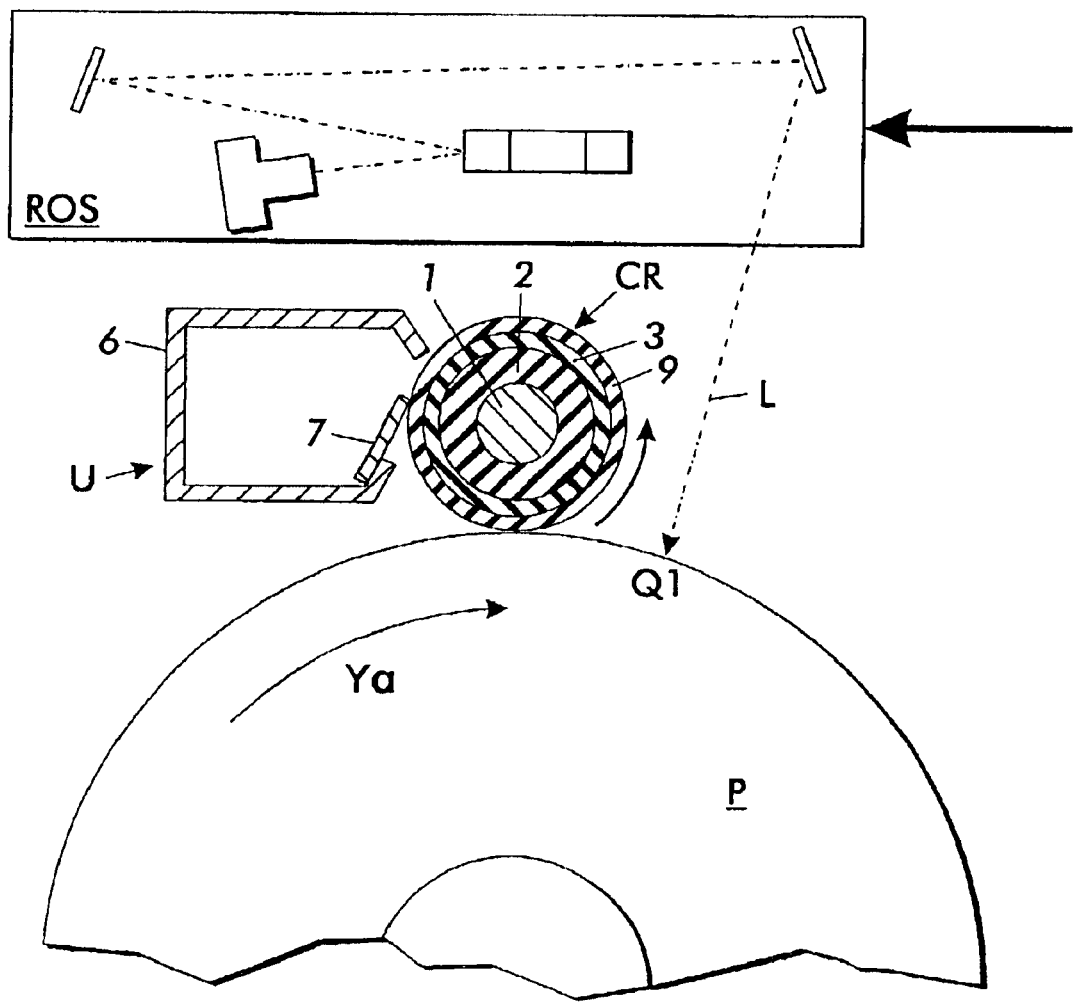
FIG. 1 is a cross sectional view for a charging roll (charging member) in Example 1 of the present invention.

The present invention achieved for overcoming the foregoing problems is to be explained next, in which each constituent of the present invention is depicted by a reference numeral for the constituent surrounded by parentheses corresponding to the reference numeral in example to be described later for facilitating correspondence with the constitution in the examples. The reason for explaining the present invention corresponding to the reference numerals of the examples is for better understanding of the present invention, and not for limiting the scope of the present invention only to that of the examples.

The foregoing can be attained in accordance with the present invention by a charging member pressed to the surface of the material to be charged for charging the material to be charged, having the following conditions: a conductive core; a conductive elastic layer formed on the surface of the conductive core to be used also as a resistance controlling layer; and a surface layer formed on the surface of the conductive elastic layer for providing the required surface roughness and surface energy to prevent contamination build-up.

The following materials can be used as the surface layer-forming resin for forming the surface layer to be used also as the resistance controlling layer and the resistance controlling conductive filler for developing conductivity by electron conduction described above. For the surface layer-forming resin: urethane, nylon, acryl, epoxy, phenolic, polyester, polyethylene, polyamide, polyimide and polyvinyl butyral resin may be used. Urethane and nylon resins are preferred. For the conductive elastic layer: rubber in which the fine powder (carbon black, metal oxide and metal) is dispersed; and silicone, urethane, styrene butadiene, NBR and epichlorohydrin rubber may be used. Epichlorohydrin rubber and urethane rubber are preferred. For the resistance controlling conductive filler: carbon black, graphite, metal oxides (for example, tin oxide, titanium oxide, zinc oxide and nickel oxide), different atom doped metal oxides (antimony-doped tin oxide) and metals may be used. Carbon black having pH of 4.0 or less, and tin oxide are preferred.

The charging member of the invention having the constitution described above is pressed onto the surface of the material to be charged to thereby charge the material to be charged. The conductive elastic layer is formed on the surface of the conductive core. The conductive elastic layer to be used also as the resistance controlling layer has a resin and the resistance controlling conductive filler for developing conductivity by electron conduction, and controls the resistance value between the conducive core and the surface of the charging member.

Figure 2:
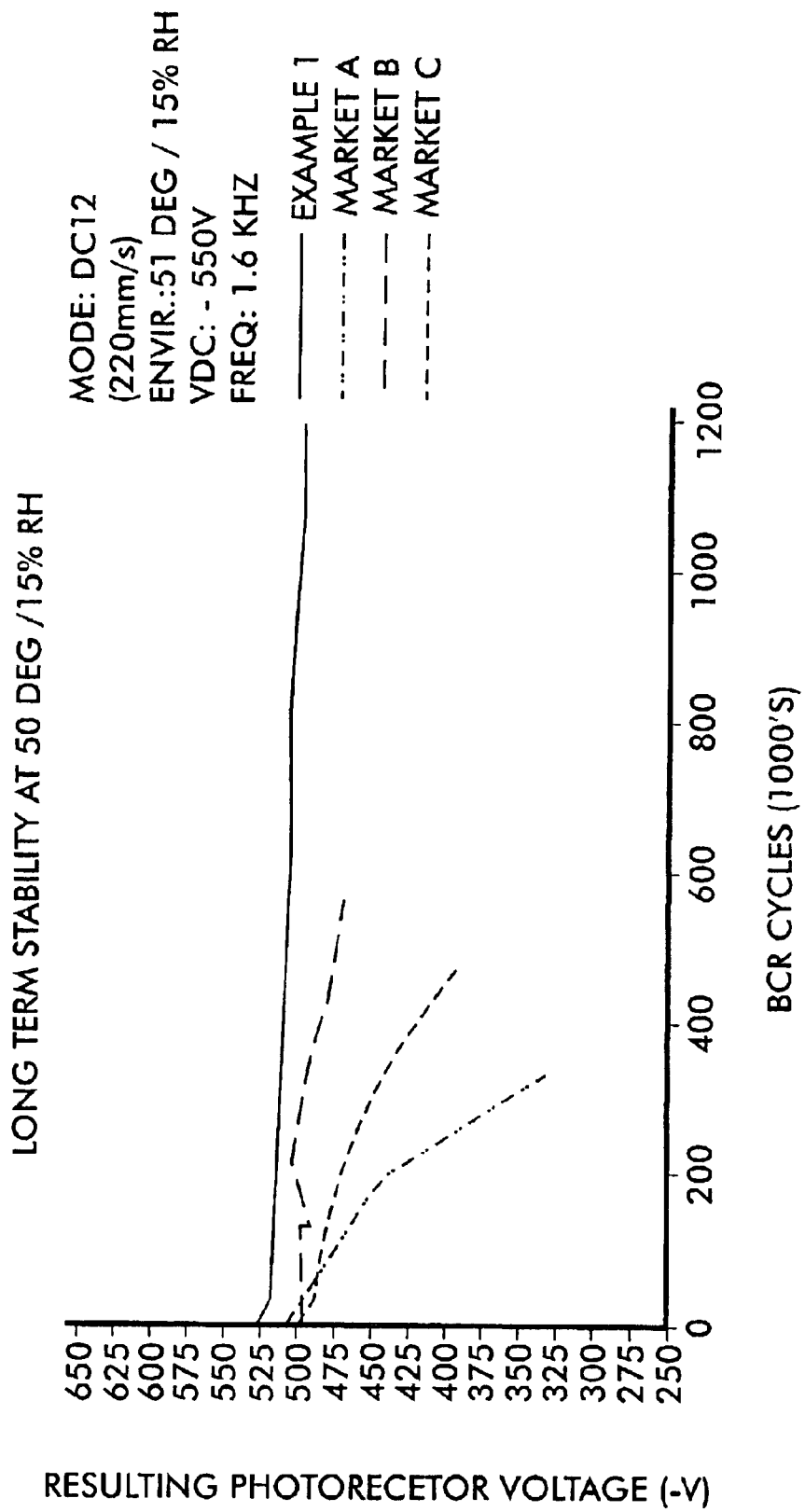
FIG. 2 is an explanatory chart showing the voltage stability applied by a charging device of the present invention, labeled Example 1.

The present invention will be explained specifically referring to examples below. FIG. 2 is an explanatory chart of the resulting charge applied to member to be charged vs. number of cycles of the charging member for Example 1 of the present invention. In FIG. 2, a charging device described in Example 1 is placed in operation against a drum photoreceptor, as shown in FIG. 1. The voltage resulting on the said photoreceptor is monitored for 72 hours of operation in a cold and dry environment (50 degrees/15% relative humidity) and plotted against the number of revolutions of the charging member described in Example 1. The data shown using a dashed line was generated using other type charging members currently available on the market that do not contain the features of the present invention. It is desirable for the resulting voltage on the photoreceptor to remain flat over time, similar to the solid line depicting the data from the charging member of the present invention.

FIG. 1 is a cross sectional view of a charging roll (charging member) in Example 1 of the present invention. In FIG. 1, the surface of an image support P rotating in the direction of an arrow Ya is charged uniformly by a charging roll CR, and then latent images are written at a latent image writing position Q1 by a laser beam L emitting from an ROS (latent image writing device). The charging roll CR is a charging member pressed on the surface of the image support P as a material to be charged. The charging roll CR comprises a conductive core 1, a conductive elastic layer 2 formed on the surface of the conductive core 1 to be used also as a resistance controlling layer formed on the surface of the conductive core, and a surface layer 3 to provide the required surface finish and surface energy. The conductive elastic core 2 to be used also as a resistance controlling layer has a resin and a resistance controlling conductive filler for developing conductivity by electron conduction, and controls the resistance value between the surface of the conductive core 1 and the surface of the charging member (the surface of the surface layer 3).

EXAMPLE 1

The charging roll CR of Example 1 shown in FIG. 1 is manufactured as described below. A conductive elastomeric was cast to a core metal of ϕ8 mm to obtain a molding product having a thickness of 4 mm. The molding product has a hardness value according to JIS-A method of 50, and a volume resistivity of four to five Log-Ohms-cm. The conductive elastic core is then ground using a center-less grinding process so that the center of the resulting core was 0.12 mm larger in the center than either end. Then a surface layer was applied to the conductive elastic core by a roll coater and dried to form a coating film of 8 μm. The said surface layer allows for the filling in of the grooves created in the grinding operation of the conductive core. It has a further objective of providing a low surface energy surface on the outside diameter of the charging member.

Figure 5:
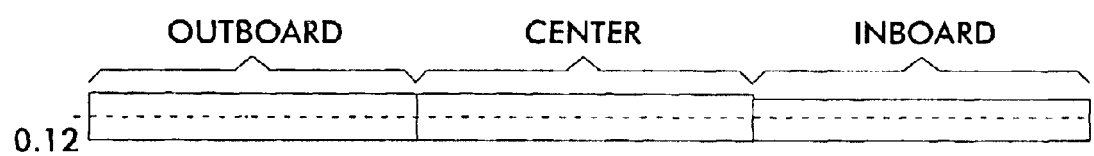

When the charging roll was assembled to a color copying machine DOCUCOLOR® 12 supplied by XEROX® Corporation, a force of 500 grams was applied to each end of the charging member to press the member against the photoreceptor device to be charged. A printing resistance test was conducted, the nip forming property with the light sensitive material was satisfactory, clear full color images could be obtained even after 1,000,000 CR revolutions, and defects of image quality due to unevenness of charging or leakage and fluctuation of image density caused by circumstantial change were not observed. The evenness of the nip created by the charging member described in Example 1 and the photoreceptor to be charged is shown in FIG. 5.

COMPARITIVE EXAMPLE 2

The charging roll of Example 2 is manufactured in an identical fashion to example 1, with the exception of the grind operation. Example 2 has a center diameter 0.10 mm larger in the center than at either end.

Figure 4:
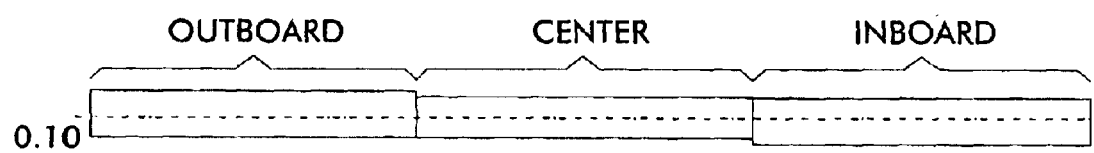

When the charging roll described in Example 2 was assembled in a color copying machine DOCUCOLOR® 12 supplied by XEROX® Corporation, a force of 500 grams was applied to each end of the charging member to press the member against the photoreceptor device to be charged. A printing resistance test was conducted, the nip forming property with the light sensitive material is shown in FIG. 4. The nip width is found to be severely smaller in the center than at either end, resulting in non-uniform halftone output.

COMPARATIVE EXAMPLE 3

The charging roll of Example 3 is manufactured in an identical fashion to Example 1, with the exception of the grind operation. Example 3 has a center diameter that is equal to the diameter at either end.

Figure 3:
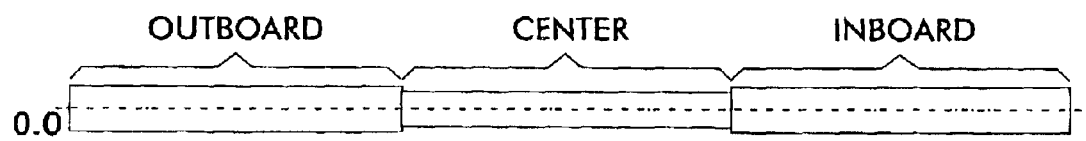
FIGS. 3, 4, and 5 show the widths of the nips generated between the charging member and the member to be charged.

When the charging roll described in Example 2 was assembled in a color copying machine DOCUCOLOR® 12 supplied by XEROX® Corp., a force of 500 grams was applied to each end of the charging member to press the member against the photoreceptor device to be charged. A printing resistance test was conducted, the nip forming property with the light sensitive material is shown in FIG. 3. The nip width shows to be severely smaller in the center than at either end, resulting in non-uniform halftone output.

Applicants have found a useful method for fabricating a charging member includes providing a conductive core, forming a conductive elastic layer on the surface of the conductive core, and forming a surface layer on the surface of the conductive elastic layer, the forming step includes forming a first conductive elastic layer; grinding the first conductive elastic layer; and applying a second surface layer on the first conductive elastic layer. The grinding step includes generating a surface having a maximum diameter in a center region thereof. The forming step includes providing a surface layer having a hardness 45 to 55 durometer. The surface layer has a thickness of 3–12 μm. The central region diameter is 0.10 to 0.14 mm greater than end regions of the charging member.

The examples of the present invention have been explained specifically above, but the present invention is not limited to the examples, and can be modified variously within a range of the gist of the present invention. For example, the present invention can be applied also to charging rolls held very close, in a non-contacting fashion, to the member to be charged, in addition to a frictional, contact type charging.

What is claimed is:

1. A method for fabrication a charging member comprising the step of:
    providing a conductive core,
    forming a conductive elastic layer on the surface of the conductive core, and
    forming a surface layer on the surface of the conductive elastic layer,
    said forming step includes forming a first conductive elastic layer; grinding said first conductive elastic layer; and applying a second surface layer on said first conductive elastic layer.

2. The method of claim 1, wherein grinding step includes generating a surface having a maximum diameter in a center region thereof.

3. The method of claim 1, wherein forming step includes providing a surface layer having a hardness 45 to 55 durometer.

4. The method of claim 1, wherein said surface layer has a thickness of 3–12 $\mu$m.

5. The method of claim 2, wherein said central region diameter is 0.10 to 0.14 mm greater than end regions of said charging member.

6. A method for fabricating a charging member for use in electrostatic printing comprising the steps of:
    providing a conductive core,
    forming a conductive elastic layer on the surface of the conductive core, and
    forming a surface layer on the surface of the conductive elastic layer,
    said forming step includes forming a first conductive elastic layer; grinding said first conductive elastic layer; and applying a second surface layer on said first conductive elastic layer.

7. The method of claim 6, wherein grinding step includes generating a surface having a maximum diameter in a center region thereof.

8. The method of claim 6, wherein forming step includes providing a surface layer having a hardness 45 to 55 durometer.

9. The method of claim 6, wherein said surface layer has a thickness of 3–12 $\mu$m.

10. The method of claim 7, wherein said central region diameter is 0.10 to 0.14 mm greater than end regions of said charging member.

* * * * *